(12) United States Patent
Grimes

(10) Patent No.: US 9,216,476 B1
(45) Date of Patent: Dec. 22, 2015

(54) ENCLOSURE FOR LASER ENGRAVING DEVICE

(71) Applicant: David M. Grimes, Chillicothe, OH (US)

(72) Inventor: David M. Grimes, Chillicothe, OH (US)

(73) Assignee: Tykma, Inc., Chillicothe, OH (US)

( * ) Notice: Subject to any disclaimer, the term of this patent is extended or adjusted under 35 U.S.C. 154(b) by 376 days.

(21) Appl. No.: 13/777,174

(22) Filed: Feb. 26, 2013

Related U.S. Application Data

(60) Provisional application No. 61/612,595, filed on Mar. 19, 2012.

(51) Int. Cl.
| B23K 26/00 | (2014.01) |
| B26D 5/20 | (2006.01) |
| B23K 26/12 | (2014.01) |
| B23K 26/08 | (2014.01) |
| B23K 26/36 | (2014.01) |

(52) U.S. Cl.
CPC .......... *B23K 26/127* (2013.01); *B23K 26/0869* (2013.01); *B23K 26/365* (2013.01)

(58) Field of Classification Search
CPC .......................... B23K 26/0656; B23K 26/365
USPC .............. 219/121.68, 121.6, 121.67; 83/76.6, 83/648, 523, 100, 597, 177
See application file for complete search history.

(56) References Cited

U.S. PATENT DOCUMENTS

| 4,156,124 | A | * | 5/1979 | Macken | B44B 7/00 219/121.68 |
| 4,403,134 | A | * | 9/1983 | Klingel | B23K 26/147 219/121.67 |
| 5,225,650 | A | * | 7/1993 | Babel et al. | 219/121.69 |
| 5,262,613 | A | * | 11/1993 | Norris et al. | 219/121.68 |
| 5,756,953 | A | * | 5/1998 | Lehmann | 219/69.12 |
| 6,160,835 | A | * | 12/2000 | Kwon | 372/108 |
| 2002/0134373 | A1 | * | 9/2002 | Gonda | 128/200.14 |
| 2002/0190435 | A1 | * | 12/2002 | O'Brien | B23K 26/032 264/400 |
| 2008/0099452 | A1 | * | 5/2008 | Akiyama | B23K 26/1482 219/121.67 |
| 2011/0000350 | A1 | * | 1/2011 | Zorzolo | B23K 26/083 83/76.6 |
| 2011/0174789 | A1 | * | 7/2011 | Li | 219/121.68 |

FOREIGN PATENT DOCUMENTS

| CH | 677332 A5 * | 5/1991 | ......... B23K 26/0823 |
| CN | WO 9900215 A1 * | 1/1999 | ........... B23K 26/365 |

* cited by examiner

Primary Examiner — Dana Ross
Assistant Examiner — Ket D Dang
(74) Attorney, Agent, or Firm — Camoriano and Associates

(57) ABSTRACT

A laser engraving device includes a retractable enclosure which provides full access to the product to be engraved for set-up while providing complete enclosure of the product during the engraving operation.

10 Claims, 2 Drawing Sheets

ENCLOSURE FOR LASER ENGRAVING DEVICE

This application claims priority from U.S. Provisional Application Ser. No. 61/612,595 filed Mar. 19, 2012, which is hereby incorporated herein by reference.

BACKGROUND

The present invention relates to a laser engraving device. More particularly, it relates to an improved enclosure for a product to be engraved using a laser engraving device.

During the engraving operation, the product being engraved is fully enclosed to protect the operator. The enclosure opens in order to insert the product before engraving and to remove the product after engraving. However, the arrangements for opening the enclosures have been very inconvenient and difficult to use, especially when inserting the product and setting up for the engraving process.

SUMMARY

An embodiment of the present invention provides an enclosure that opens to provide full 360 degree access to the part during setup. Before the engraving operation begins, the enclosure is moved downwardly until its bottom edge engages a safety recess for beam containment. The enclosure can be extended and retracted in the vertical direction, so the height of the enclosure can be adjusted, which allows the distance between the laser and the base on which the product rests to be adjusted in order to obtain the proper focal length for the engraving process, while still providing a complete enclosure around the product being engraved.

DESCRIPTION

Figure 1:
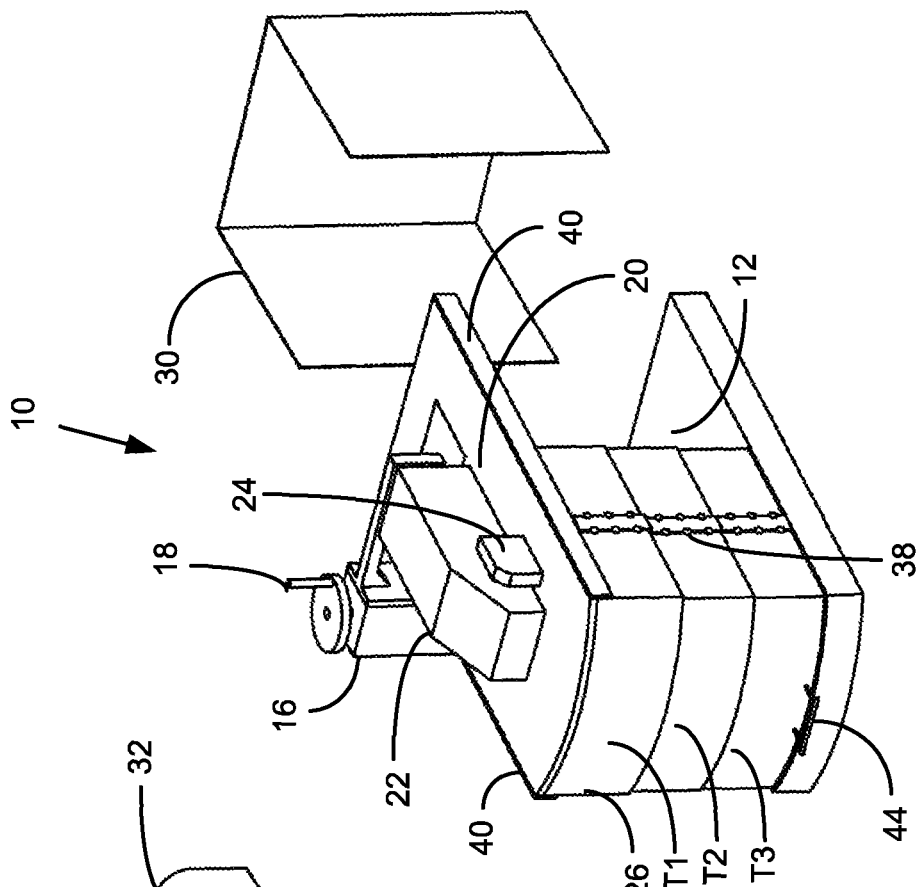
FIG. 1 is a partially exploded perspective view of a laser engraving device with one embodiment of an extendable enclosure, with the enclosure extended and in the fully closed position.

FIGS. 1-5 show a laser engraving device 10. The laser engraving device 10 includes a platform 12 with a flat top surface, a portion of which serves as a loading table 14 for loading parts or products into the device 10. A tool post 16 is secured to one end of the platform 12. In this embodiment, the tool post 16 is manually operated and includes a hand crank 18 to manually raise and lower the laser carriage 20 relative to the platform 12. Alternatively, the tool post 16 could be operated automatically by a motor.

The laser carriage 20 supports a laser system 22 used for engraving a product (not shown) that is placed on top of the loading table 14. In this embodiment of the laser engraving device 10, a laser sensor 24 is used to measure the distance between the engraving laser and the product to be engraved in order to automatically determine when the correct focal distance between the engraving laser and the top surface of the part or product to be engraved has been reached. As explained in more detail later, the operator slowly lowers the laser carriage 20 by turning the hand crank 18 on the tool post 16 until the laser sensor 24 emits an audible tone, indicating the correct position has been reached. Alternatively, the correct position could be determined visually by the operator when the part is on the loading table 14 and the enclosure 26 is in an open, retracted position, described below.

Suspended from the laser carriage 20 is a 360 degree (closed geometric shape) enclosure 26 which can be telescopically extended or retracted in the vertical direction over the loading table 14, and which also can be displaced horizontally away from the loading table 14, as explained in more detail below.

Since the enclosure 26 is suspended from the laser carriage 20, it travels up and down in a vertical direction along with the laser carriage 20. The enclosure 26 also can be extended and retracted in the vertical direction to adjust the height of the enclosure. This permits the focal length to be adjusted while still allowing the enclosure 26 to completely enclose the part being engraved.

In this embodiment, the enclosure 26 has a generally rectangular cross-section, with four vertical wall portions oriented at right angles to each other. However, the cross-sectional shape could be circular, oval or some other desired closed geometric shape.

Figure 2:
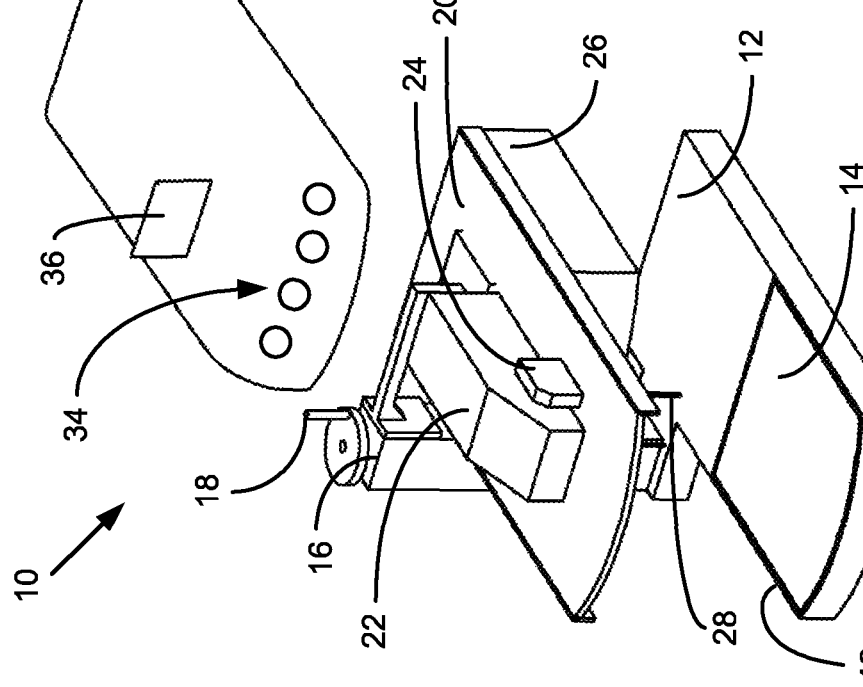
FIG. 2 is a perspective view of the laser engraving device of FIG. 1 with the enclosure fully retracted and displaced horizontally to provide full access to the table which supports the product to be engraved.
Figure 3:
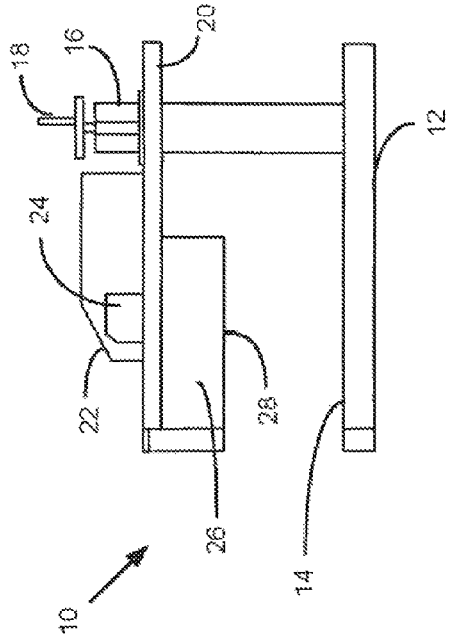
FIG. 3 is a side view of the laser engraving device in the fully retracted and horizontally displaced position shown in FIG. 2.
Figure 4:
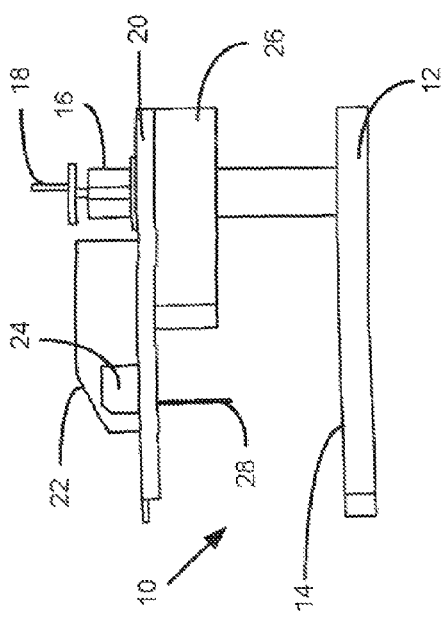
FIG. 4 is a side view of the laser engraving device of FIG. 3, with the enclosure fully retracted and located directly above the loading table which supports the product to be engraved.

The dark line 28, shown in FIGS. 2, 3, and 4, represents a laser beam of light and is not a structural part of the device. The beam 28 is shown in the other views only as a reference point.

Also shown in FIG. 1 is a removable rear cover 30 to cover and protect electronic components. FIG. 2 shows a removable cover 32 to cover and protect the laser components of the laser system 22, including the laser sensor 24. This cover 32 may include a control panel 34 and a pop-up touch screen 36 to provide a user interface for the laser engraving device 10.

Referring now to FIG. 1, the laser engraving device 10 includes an enclosure 26 which defines a closed geometric shape in order to completely encircle the part to be engraved and which may be extended downwardly to contact the loading table 14 and completely enclose the part to be engraved, or may be retracted upwardly to expose the loading table 14 and the part that is resting on the table 14.

The enclosure 26 may also be moved horizontally, while the laser carriage 20 and loading table 14 remain stationary, from a first position, shown in FIG. 4, where the enclosure 26 is directly above the loading table 14, to a second position, shown in FIGS. 2 and 3, where the enclosure 26 is displaced horizontally rearwardly, at least partially offset from the loading table 14.

In this embodiment, each of the four wall portions of the enclosure 26 has three telescoping members or tiers T1, T2, and T3, (See FIGS. 2 and 5) with the two lower tiers T2, T3 able to telescopically collapse into the upper tier T1. The lowest tier T3 has outside dimensions that are slightly smaller than the next adjacent tier T2, which, in turn, has outside dimensions that are slightly smaller than the next adjacent tier T1, so the lowest tier T3 fits inside the next tier T2, and so forth, as the enclosure 26 is retracted. Of course, the number of tiers could vary depending upon the part height.

A system of guide rails or tracks 38 (shown schematically in FIG. 1) is used to maintain the tiers T1-T3 in proper alignment and to guide the tiers of the enclosure 26 as they move up and down, moving upwardly to retract and downwardly to extend.

Small projections (not shown) are provided on the tiers to serve as stops in order to ensure that there is always some overlap between the adjacent tiers of the enclosure 26 and to prevent the tiers from completely separating from each other.

The enclosure 26 can be held in the vertically retracted position by one or more means, such as by magnets, springs, cables, or a latch (not shown). The bottom tier T3 has a handle 44 to assist the user in raising and lowering (opening and closing) the enclosure 26.

When the enclosure 26 is retracted or raised, it can be moved horizontally utilizing a system of bearings and/or guide rails 40. For example, a system similar to a drawer glide arrangement may be used.

The loading table 14 defines a continuous groove 42 in a closed geometric shape 5 which corresponds to the closed geometric shape of the enclosure 26 and which is sized to receive the bottom edge of the bottom tier T3 of the enclosure 26 when the enclosure 26 is extended enough to contact the bottom surface of the groove 42. The wall of the groove 42 serves as a curb. When the enclosure 26 is extended to the bottom of the groove 42, it overlaps the curb in the vertical direction, which provides a positive seal so the enclosure 26 completely encloses the part during the engraving process and prevents any errant light from the laser engraving operation from exiting the enclosure 26.

It would also be possible for the loading table 14 to have a raised surface portion or a lowered surface portion which supports the part to be engraved and which forms a curb around its periphery, with the curb being overlapped by the enclosure 26 when the enclosure 26 is fully lowered in order to provide a positive seal.

It may be appreciated that, since the enclosure 26 is mounted onto the laser carriage 20, and the laser carriage 20 is raised and lowered by the user using the tool post 16, then the top end of the enclosure 26 is automatically raised and lowered by the user when he raises and lowers the laser carriage 20.

To use the laser engraving device 10, the operator first moves the enclosure 26 to the configuration shown in FIG. 3, wherein the enclosure 26 is in the fully raised (vertically retracted) position and is displaced rearwardly horizontally, to allow the operator free, 360 degree access to the loading table 14. As shown in FIGS. 1 and 2, the tool post 16 is off to the side of the platform 12, so it does not interfere with the forward and rearward movement of the enclosure 26. Once the product to be engraved (not shown) has been placed on the loading table 14, the operator turns the crank 18 to adjust the height of the laser carriage 20 so the laser is positioned at the correct height above the product to be engraved.

The operator may use a method for sensing the position of the laser relative to the part that can be accomplished safely with the enclosure 26 fully retracted. Using that sensing method, the operator adjusts the height of the laser carriage 20 until the correct position has been reached. For example, in one particular embodiment, the focal length of the laser is three inches, so the height of the laser carriage 20 is adjusted until the laser is three inches above the top surface of the part to be engraved. In this embodiment, the operator adjusts the height by turning the hand crank 18 on the tool post 16. He may adjust the height until the sensor 24 emits an audible tone, indicating the correct height has been reached, or, if he is using a visual system, he adjusts the height until he sees the visual indicator showing that the correct height has been reached.

If the tool post 16 is operated by a motor, the operator would operate the motor until the correct height is reached. If the system is fully automated, then the operator just pushes a button, and the automated sensor sends a signal to a controller to control the motor to move the carriage 20 up or down until the correct height is reached.

Figure 5:
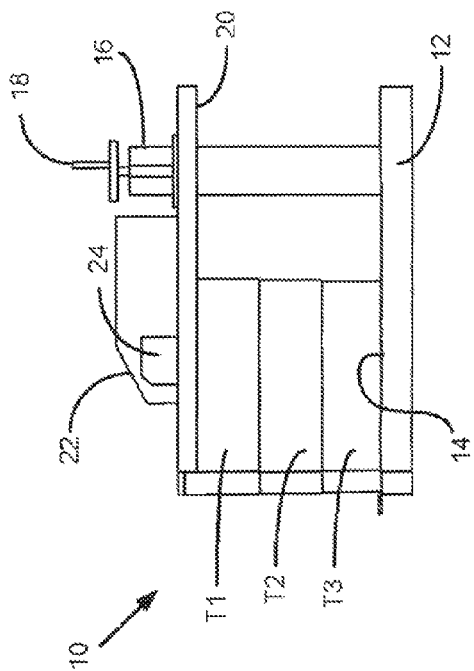
FIG. 5 is a side view of the laser engraving device of FIG. 4, with the enclosure extended downwardly to fully enclose the product to be engraved.

Once the carriage 20 is at the correct height relative to the product to be engraved, the operator moves the enclosure 26 horizontally forward along the glide rails 40, to the position shown in FIG. 4, wherein the enclosure 26 is directly above the part loading table 14. He then extends the enclosure 26 downwardly, as shown in FIG. 5, until the bottom edge of the enclosure 26 is received in the groove 42 in the loading table 14 and rests on the bottom surface of the groove 42 so that the enclosure 26 overlaps the curb formed by the groove 42. The bottom edge of the enclosure 26 defines a bottom opening which receives the part as the enclosure 26 is extended into contact with the loading table 14.

Alternatively, if an automated sensor 24 is used, the operator could set the height of the carriage after the enclosure 26 is extended with the bottom edge of the enclosure 26 received in the groove 42, enclosing the product to be engraved. In that case, the enclosure 26 would automatically retract as the carriage 20 moves downwardly and extend as the carriage 20 moves upwardly, always keeping the part fully enclosed.

For example, the operator could slowly lower the laser carriage 20 by turning the hand crank 18 on the tool post 16 until the laser sensor 24 emits an audible tone, indicating the correct focal height has been reached. As the laser carriage 20 is raised and lowered, the weight of the tiers T1-T3 causes them to remain as extended as needed to keep the part fully enclosed, with the lowermost tier T3 resting on the bottom of the groove 42 and overlapping the curb formed by the groove 42.

While the embodiment described above shows one example of a laser engraving device with an enclosure that allows full access to the product to be engraved, various modifications would be obvious to a person of ordinary skill in the art. For example, instead of using a telescoping wall, the enclosure could have an accordion-type wall. Various other modifications may be made to the embodiment described above without departing from the scope of the present invention as claimed.

What is claimed is:

1. A laser engraving device, comprising:
   a platform defining a loading table at a first elevation, said loading table defining a curb that defines a closed geometric shape;
   a tool post;
   a laser carriage mounted on said tool post for upward and downward movement relative to said platform;
   a laser carried on said laser carriage; and
   a retractable enclosure suspended from said laser carriage, said retractable enclosure being retractable and extendable in the vertical direction and having a bottom edge defining a bottom opening, said bottom edge having a bottom edge shape that matches the closed geometric shape of the curb;
   wherein said retractable enclosure is movable from a retracted position in which the bottom edge is at an elevation spaced upwardly above the elevation of the loading table, to an extended position in which the bottom edge is received in said curb.

2. A laser engraving device as recited in claim 1, wherein said retractable enclosure is movable horizontally, while said laser carriage and said platform remain stationary, from a first position directly above said loading platform to a second position at least partially offset from said loading platform.

3. A laser engraving device as recited in claim 2, and further comprising a distance sensor mounted on said laser carriage.

4. A laser engraving device as recited in claim 3, wherein said sensor provides an audible tone when the laser is at a correct focal length relative to an item resting on said platform.

5. A laser engraving device as recited in claim 2, wherein, when the retractable enclosure is in the extended position, the enclosure overlaps the curb in the vertical direction and lies inside the curb so that the curb forms a seal.

6. A laser engraving device as recited in claim 3 wherein said retractable enclosure includes a telescoping wall suspended from said laser carriage.

7. A laser engraving device as recited in claim 6, wherein, when the retractable enclosure is in the extended position, the enclosure overlaps the curb in the vertical direction and lies inside the curb so that the curb forms a seal.

8. A laser engraving device as recited in claim 3 wherein said retractable enclosure includes an accordion-type wall suspended from said laser carriage.

9. A laser engraving device as recited in claim 8, wherein, when the retractable enclosure is in the extended position, the enclosure overlaps the curb in the vertical direction and lies inside the curb so that the curb forms a seal.

10. A laser engraving device as recited in claim 1, wherein, when the retractable enclosure is in the extended position, the enclosure overlaps the curb in the vertical direction and lies inside the curb so that the curb forms a seal.

* * * * *